United States Patent [19]

Nakano et al.

[11] Patent Number: 5,284,716
[45] Date of Patent: Feb. 8, 1994

[54] MAGNETIC RECORDING MEDIUM

[75] Inventors: Yasushi Nakano; Yoshitaka Yasufuku; Noboru Koyama; Masahiro Umemura; Takemasa Namiki; Seiichi Tobisawa; Shigetoshi Kawabe; Takeshi Nakajima, all of Tokyo, Japan

[73] Assignee: Konica Corporation, Tokyo, Japan

[21] Appl. No.: 573,115

[22] PCT Filed: Jan. 19, 1990

[86] PCT No.: PCT/JP90/00060
§ 371 Date: Sep. 5, 1990
§ 102(e) Date: Sep. 5, 1990

[87] PCT Pub. No.: WO90/08380
PCT Pub. Date: Jul. 26, 1990

[30] Foreign Application Priority Data

Jan. 19, 1989 [JP] Japan .................. 1-10875
Mar. 14, 1989 [JP] Japan .................. 1-62683
Mar. 28, 1989 [JP] Japan .................. 1-77447

[51] Int. Cl.$^5$ .................. B32B 5/16; G11B 5/66
[52] U.S. Cl. .................. 428/694 BU; 428/336; 428/694 BN; 428/694 BM; 428/900
[58] Field of Search .................. 428/329, 694, 900, 336, 428/694 BU, 694 BN, 694 BM

[56] References Cited

U.S. PATENT DOCUMENTS

| 4,323,621 | 4/1982 | Kober et al. | 428/216 |
| 4,911,951 | 3/1990 | Ogawa et al. | 428/900 |
| 4,980,230 | 12/1990 | Saito et al. | 428/329 |
| 5,035,856 | 7/1991 | Koyama et al. | 428/694 |

FOREIGN PATENT DOCUMENTS

| 52-85054 | 7/1977 | Japan . |
| 55-69839 | 6/1980 | Japan . |
| 55-83208 | 6/1980 | Japan . |
| 57-56904 | 4/1982 | Japan . |
| 57-198606 | 12/1982 | Japan . |
| 58-60506 | 4/1983 | Japan . |
| 58-216790 | 6/1984 | Japan . |
| 60-7105 | 1/1985 | Japan . |
| 60-86806 | 5/1985 | Japan . |
| 60-154502 | 8/1985 | Japan . |
| 60-217529 | 10/1985 | Japan . |
| 61-63921 | 4/1986 | Japan . |
| 60-229512 | 4/1987 | Japan . |
| 62-159340 | 7/1987 | Japan . |
| 62-232724 | 10/1987 | Japan . |
| 62-248128 | 10/1987 | Japan . |

*Primary Examiner*—Paul J. Thibodeau
*Assistant Examiner*—Leszek Kiliman
*Attorney, Agent, or Firm*—Jordan B. Bierman

[57] ABSTRACT

A magnetic recording medium is disclosed which comprises a first magnetic layer on a nonmagnetic support and a second magnetic layer on the first magnetic layer.

The first magnetic layer contains A parts by weight of at least one of Si and Al per 100 parts by weight of magnetic materials, and the second magnetic layer contains B parts by weight of at least one of Si and Al per 100 parts by weight of magnetic materials, wherein A is smaller than B.

This magnetic recording medium is characterized in that: the magnetic recording medium does not stain the conveyance rollers in the manufacturing process; problems which tend to occur when running conventional tapes are greatly reduced; and it is suitable for use as a video tape.

10 Claims, No Drawings ically appearing a magnetic recording medium such as a magnetic tape, a magnetic sheet, a magnetic disk, and the like is

MAGNETIC RECORDING MEDIUM

FIELD OF TECHNOLOGY

The present invention relates to improvements in a magnetic recording medium such as a magnetic tape, a magnetic sheet, a magnetic disk, and the like.

BACKGROUND OF TECHNOLOGY

Conventionally, a magnetic recording medium is manufactured by coating magnetic material to a support and then dried, wherein ferromagnetic particles, a hardening agent, a dispersion agent, an abrasive, a lubricant, a matting agent, an antistatic additive, and other additives are added into a binder of the magnetic coating material and an adequate solvent is also added if necessary.

In order to improve the chemical stability of magnetic material, the following conventional method is widely known: a small amount of nickel, cobalt, titanium, silicon, and aluminum is added into the magnetic material in the form of a metal, a salt or an oxide; or the surface of the magnetic material is treated by the elements described above.

Conventionally, identical magnetic materials have been used for both the upper and lower layers of a multilayer magnetic recording medium in which magnetic materials treated by silicon, aluminum, and the like are used. For that reason, the content of silicon, aluminum and the like of magnetic materials in the upper and lower layers are equal.

However, this type of magnetic recording medium has the following disadvantages: after drying in the manufacturing process, the conveyance rollers (the conveyance rollers will be called the rollers hereafter in this specification) to convey the magnetic recording medium are stained by the magnetic recording medium; and the running efficiency of the magnetic recording medium is lowered when the temperature and humidity are high.

The objects of the present invention are to provide a magnetic recording medium characterized in that: the magnetic recording medium does not stain the conveyance rollers to convey the magnetic recording medium after the drying process during manufacture; and the running efficiency of the magnetic recording medium is high even when the temperature and humidity are high.

Another object of the present invention is to provide a magnetic recording medium characterized in that: the electromagnetic conversion characteristics are excellent; both sliding noise and dropout (D/O) are low; and the magnetic recording medium is suited for video tape use.

DISCLOSURE OF THE INVENTION

The magnetic recording medium of the present invention comprises the first magnetic layer (the lower layer) and the second layer (the upper layer) provided on a nonmagnetic support. The magnetic recording medium of the present invention is composed in such a manner that $A<B$, wherein A wt parts of at least one of Si and Al are contained in 100 wt parts of the magnetic materials of the first magnetic layer and B weight parts of at least one of Si and Al are contained in 100 wt parts of the magnetic materials of the second magnetic layer. A or B is the sum of the weight parts of Si and Al in each magnetic material.

The magnetic materials used in each magnetic layer can contain either Si or Al, or can contain a mixture of Si and Al. The magnetic layer can contain both Si and Al. It is preferable that A and B are defined as $0<A<0.1$ and $0.05<B<2.0$. It is more preferable that B is not less than 0.1 and not more than 1.0.

In the case of $A>0.1$, the running efficiency of the magnetic recording medium tape is a little lowered and the tape edges tend to be damaged when the temperature and humidity are high.

When B is not more than 0.1, the conveyance rollers in the drying process and the heat rollers in the calender process tend to become stained.

On the other hand, when B is not less than 2, the conveyance rollers and heat rollers tend to become stained. In order to improve the dispersion of the ferromagnetic powder in the magnetic layer and to obtain excellent electromagnetic conversion characteristics and running efficiency, it is preferable that Si of 0.3 to 1.0 wt% or Al of 0.05 to 0.3 wt is contained in the magnetic materials of the second magnetic layer.

Examples of the magnetic materials for use in the magnetic recording medium of the present invention can be given as follows: $\gamma\text{-Fe}_2\text{O}_3$, $\text{Co-}\gamma\text{-Fe}_2\text{O}_3$ such as $\gamma\text{-Fe}_2\text{O}_3$ containing Co or $\gamma\text{-Fe}_2\text{O}_3$ adsorbing Co, $\text{Fe}_3\text{O}_4$, and $\text{Co-}\gamma\text{-Fe}_3\text{O}_4$ such as $\text{Fe}_3\text{O}_4$ containing Co or $\text{Fe}_3\text{O}_4$ adsorbing Co; the oxide magnetic materials such as $\text{CrO}_2$; and various kinds of ferromagnetic metals, the main components of which are Fe, Ni, and Co, such as Fe, Ni, Fe-Ni alloy, Fe-Co alloy, Fe-Ni-P alloy, Fe-Ni-Co alloy, Fe-Mn-Zn alloy, Fe-Ni-Zn alloy, Fe-Co-Ni-Cr alloy, Fe-Co-Ni-P alloy, Co-P alloy, Co-Cr alloy, and the like.

Oxide magnetic material containing Co is preferable among the materials described above.

Si or Al is contained in these magnetic materials if necessary.

The magnetic material containing Si and Al related to the present invention can be obtained as follows. An example is given on the condition that the magnetic materials are produced from ferrous oxide magnetic materials. For instance, needle-shaped magnetic ferrous oxide and Si or Al salt are mixed in an alkaline water solution and heated. After that, the materials are washed in water and dried. Then, the materials are heat-treated in a nondeoxidizing atmosphere such as air, $N_2$ gas, and the like.

It is presumed that Si or Al exist on the surface of the completed magnetic materials. That is the reason why the above-described procedure is known as surface treatment of magnetic materials.

The magnetic material used in the lower layer does not necessarily contain Si or Al. It is preferable that the difference between A and B is 0.05 to 2.0.

It is preferable that the average major axis length of the magnetic particles used in the first magnetic layer is not more than 0.35 μm and the axial ratio is 8 to 11, and that the average major axis length of the magnetic particles used in the second magnetic layer is not more than 0.25 and the axial ratio is 7 to 8. When the average major axis length is too short, the magnetic particles tend to break since they are needle-shaped. For that reason, an average major axis of not less than 0.1 μm is preferable.

Polyurethane with abrasive resistance property is preferably used as the binder in the present invention. The reason is that the cohesive strength of polyurethane is so high that it is resilient against repeated stress and bending, and furthermore it is highly resistant to wear and various climatic conditions.

When cellulose resin and vinylchloride copolymer are used together with polyurethane, the dispersion in the magnetic layer is improved and the mechanical strength of the magnetic layer is increased. When only cellulose resin and vinylchloride copolymer are used in the binder, the magnetic layer becomes too hard. Polyurethane is necessary in the magnetic layer in order to prevent the magnetic layer from becoming too hard.

Cellulose ether, cellulose inorganic acid ester, cellulose organic acid ester, and the like can be chosen from among cellulose resins to be used. Polyurethane and vinylchloride copolymer may be partly hydrolyzed. A copolymer containing vinylchloride-vinylacetate and a copolymer containing vinylchloride-vinylacetate-vinylalcohol can be preferably chosen from among vinylchloride copolymers to be used. Phenoxy resin can also be used. The advantageous points of phenoxy resin are: its mechanical strength is high; its dimensional stability is excellent; it is waterproof; its chemical resistance is excellent; and its adhesive property is excellent. The above-described advantageous points of phenoxy resin can compensate for the disadvantageous points of polyurethane and the time-standing-stability of the magnetic materials can be remarkably increased.

The mixtures of the above-described binders and thermoplastic resin, thermosetting resin, reacting resin, and electron-beam curable resin may be used instead of the above-described binders.

The resin modified by a functional group or a functional group which forms inner complex salt, especially modified vinylchloride resin, modified polyurethane resin, or modified polyester resin are preferable as the binder used in the present invention in terms of the dispersion of magnetic particles and other components.

The following are examples of the functional groups in the above-mentioned resins: —SO$_3$M; —OSO$_2$M; —COOM; and

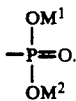

In this case, M is either a hydrogen atom, lithium or sodium. M$^1$ and M$^2$ are either a hydrogen atom, lithium, potassium, a sodium atom or an alkyl group. M$^1$ can be different from or the same as M$^2$.

These functional groups can be obtained by condensing resins such as vinylchloride resin, polyester resin and polyurethane resin, and the compounds containing a negative functional group and chloride in the molecule such as Cl—CH$_2$CH$_2$SO$_3$M, Cl—CH$_2$C-H$_2$OSO$_2$M, Cl—CH$_2$COOM, and

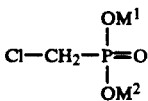

through the method of a dehydrochloride reaction, wherein the meanings of M, M$^1$, and M$^2$ are the same as those described above.

The resin made by introducing a negative functional group to vinylchloride resin and polyurethane resin are preferable among the resins obtained in the manner described above.

In the magnetic materials of the present invention, it is preferable that the resin containing a functional group is contained as the binder in the second magnetic layer.

The resin containing a functional group has been described above. The resin made by introducing a negative functional group to vinylchloride resin and polyurethane resin are preferable among the resins described above. Suitable examples are vinylchloride resin containing sulfonic potassium, polyurethane resin containing sulfonic acid, and the like.

It is preferable that 1 to 20 weight parts of resin containing the above-described functional group per 100 weight parts of magnetic material are contained in the second magnetic layer.

As far as the effect of the present invention is not decreased, an optional binder can be contained in the second magnetic layer together with the resin containing the above-described functional group.

The first magnetic layer may contain the resin containing a functional group which is used in the second magnetic layer.

In this kind of magnetic material, carbon black is usually used as a light shielding agent or an antistatic additive.

Carbon black is also used in order to attain the above-described object in the present invention. In the present invention, it is effective in reducing sliding noises that carbon black, the average particle size of which is not smaller than 50 mμm, is contained in the second magnetic layer.

The upper limit of the average particle size is preferably about 100 mμm. It is preferable to add 0.1 to 1.5 weight parts of carbon black per 100 weight parts of magnetic powder.

The average particle size of carbon black contained in the first magnetic layer is preferably 5 to 25 mμm. It is preferable to add 2 to 15 weight parts of carbon black per 100 parts of magnetic powder.

It is preferable that the thickness of the second magnetic layer of the magnetic recording medium of the present invention is not more than 1.0 μm. The lower limit is preferably not less than 0.1 μm. The thickness of the first magnetic layer is preferably 1.0 to 3.8 μm.

In order to improve the durability of the magnetic tape of the present invention, various kinds of hardening agents such as isocyanate may be contained in the magnetic coating material.

Examples of aromatic isocyanate are tolylene diisocyanate (TDI) and the addition products made from tolylene diisocyanate and activated hydrogen compounds. The average molecular weight is preferably 100 to 3000.

Examples of aliphatic isocyanate are hexamethylene diisocyanate (HMDI) and addition products made from hexamethylene diisocyanate and activated hydrogen compounds. Aliphatic isocyanate the molecular weight of which is 100 to 3000 is preferably used. Non-alicyclic type isocyanate and the addition product made from isocyanate compounds and activated hydrogen compounds are preferably used.

The dispersing agent is usually added into the magnetic coating material which is used to form the magnetic layer. If necessary, additives such as a lubricant, an abrasive, a matting agent, and an antistatic additive may be contained in the magnetic coating material.

The dispersing agents used in the present invention are as follows: phosphoric ester, amine compounds, alkyl sulfate, fatty acid amide, higher alcohol, polyethylene oxide, sulfosuccinic acid, sulfosuccinate, other surface active agents, and salts made from the compounds described above. The salt of a polymer-dispersing agent with a negative organic group such as —COOH may be used as the dispersing agent used in the present invention. Only one kind of dispersing agent may be used in the magnetic coating material of the invention or not less than two kinds of dispersing agents may be jointly used. In some cases which will be described later, the dispersing agent need not be used in the magnetic coating material of the present invention, which is one of the most preferable embodiments of the invention.

The following can be used as the lubricant in the magnetic coating material of the invention: silicon oil; grafite; carbon black; graftopolymer; molybdenum disulfide; tungsten disulfide; lauryl acid; myristic acid; fatty acid ester made from monobasic fatty acid, the number of carbon atoms of which is 12 to 16 and made from monohydric alcohol, the number of carbon atoms of which, together with the number of carbon atoms of the above-described fatty acid make 21 to 23; and wax.

These lubricants are added into the magnetic coating material in such a manner that 0.05 to 10 parts by weight of lubricant per 100 parts by weight of binder are added into the magnetic coating material.

Preferable lubricants in the present invention are stearic acid, myristic acid, palmitic acid, and oleic acid. It is preferable that 0.5 to 5.0 parts by weight of lubricant per 100 parts by weight of magnetic powder are added into the magnetic coating material in the upper magnetic layer and 0.5 to 8.0 parts by weight of lubricant per 100 parts by weight of magnetic powder are added into the magnetic coating material in the lower magnetic layer.

The following may be used as the abrasive in the present invention: various kinds of alumina such as fused alumina and α-alumina, silicon carbide, chromium oxide, corundum, artificial corundum, artificial diamond, garnet, and emery the main components of which are corundum and magnetite. The average particle size of the abrasive is 0.05 to 5 μm, and more preferably 0.1 to 2 μm. 1 to 20 parts by weight of the abrasive per 100 parts by weight of the binder are added into the magnetic coating material.

Organic powder and inorganic powder are individually or jointly used as the matting agent in the magnetic coating material.

Preferable examples of organic powder are acrylic styrene resin, benzo guanamine resin powder, melamine resin powder, and phthalocyanine pigment. The following can be used as the organic powder other than the organic powder described above: polyolefin resin powder, polyester resin powder, polyamide resin powder, polyimido resin powder, and polyfluorinated ethylene resin powder.

The following can be used as inorganic powder: silicon oxide, titanium oxide, aluminum oxide, calcium carbonate, barium sulfate, zinc oxide, tin oxide, aluminum oxide, chromium oxide, silicon carbide, calcium carbide, α-$Fe_2O_3$, talc, kaolin, calcium sulfate, boron nitride, zinc fluoride, and molybdenum dioxide.

The following can be used as an antistatic additive: conductive powder such as carbon black, graphite, tin oxide-antimony oxide compounds, and titanium oxide-tin oxide-antimony oxide compounds; natural surface active agents such as saponin; nonion surface active agents such as alkylene oxide, glycerol, and glicidol; cation surface active agents such as higher alkyl amine, fourth grade ammonium salt, pyridine, other heterocycles, phosphonium, and sulfonium; anion surface active agents containing acid groups such as carboxylic acid, sulfonic acid, phosphoric acid, sulfate groups, and phosphate groups; and ampholytic surfactants such as amino acid, amino sulfonic acid, sulfate or phosphate of amino alcohol.

The following can be used as a solvent to be contained in the magnetic coating material or as a solvent to be used when the magnetic coating material is diluted: keton such as aceton, methyl ethyl keton, methyl isobutyl keton, and cyclohexanone; alcohol such as methanol, ethanol, propanol, and butanol; ester such as methyl acetate, ethyl acetate, butyl acetate, ethyl lactate, and ethyleneglycol monoacetate; ether such as glycol dimethyl ether, glycol monoethyl ether, dioxane, and tetrahydrofuran; aromatic hydrocarbons such as benzene, toluene, and xylene; hydrocarbon halogenide such as methylene chloride, ethylene chloride, carbon tetrachloride, chloroform, and dichlorobenzene.

The following can be used as a support: polyester such as polyethylene terephthalate, and polyethylene-2,6-naphthalate; polyoleffine such as polypropylene; cellulose derivatives such as cellulose triacetate, and cellulose diacetate; plastic such as polyamide, and polycarbonate; metals such as Cu, Al, and Zn; and ceramics such as glass, boron nitride, and Si carbide.

When the support is a film or a sheet, its thickness is preferably 3 to 100 μm, more preferably 5 to 50 μm. When the support is a disk or a card, its thickness is 30 μm to 10 mm. When the support is a drum, it is used in a cylindrical form. The form of support is determined in accordance with the type of recorder.

An intermediate layer may be provided between the support and the magnetic layer in order to improve the adhesive property.

Another magnetic layer or a nonmagnetic layer may be provided on the first magnetic layer or the second magnetic layer, or below the first magnetic layer or the second magnetic layer, or between the first magnetic layer and the second magnetic layer.

The following are the coating methods to form the above-mentioned magnetic layer on a support: the air doctor coating method, the blade coating method, the air knife coating method, the squeeze coating method, the impregnating coating method, the reverse roller coating method, the transfer roller coating method, the photogravure coating method, the kiss coating method, the cast coating method, the spray coating method, and the extrusion coating method, wherein it can be understood that the coating method is not limited to the specific examples described above.

When the magnetic layer is formed on the support by the coating method described above, there are two systems. One is called the wet-on-dry-coating system in which each layer is coated and dried and this procedure is repeatedly conducted layer by layer. The other is called the wet-on-wet-coating system in which the upper layer is coated on a previously coated wet layer and this procedure is repeatedly conducted layer by layer. Both can be applied to the manufacturing process of the magnetic recording medium of the present invention.

After the ferromagnetic metal oxide powder in the magnetic layer coated on the support by the coating method described above, is magnetically oriented if necessary, the magnetic layer is dried. In this case, the magnetic flux density of the magnetic orientation field is about 500 to 5000 gauss by D.C or A.C current, the drying temperature is approximately 50 to 120° C., and the drying time is approximately 0.01 to 10 min. If necessary, surface smoothing treatment is conducted for the magnetic medium or the magnetic medium is cut to the required size to manufacture the magnetic recording medium of the present invention.

THE BEST MODE TO CARRY OUT THE PRESENT INVENTION

The following is a description of the best mode conducted by the inventor of carrying out his invention.

The following is a description of a magnetic recording medium characterized in that: the magnetic recording medium has excellent electromagnetic conversion characteristics; the magnetic recording medium produces little sliding noise and dropout (D/O); and the magnetic recording medium is suitable as a video tape.

The structure of the magnetic recording medium can be described as follows: the first magnetic layer (the lower layer) and the second magnetic layer (the upper layer) are provided on a nonmagnetic support; (1) the surface of the magnetic material in the second magnetic layer is treated by Al and/or Si; (2) the binder contained in the second magnetic layer is resin containing a functional group; (3) carbon black the average particle size of which is 50 mμ, is contained in the second magnetic layer; and (4) the thickness of the second magnetic layer is not less than 1.0 μm.

The effect of the magnetic recording medium of the present invention will be described as follows.

After the magnetic coating materials for use in the first magnetic layer and the second magnetic layer described in the composition on Table I and Table II, were sufficiently kneaded, weight parts of a hardening agent, polyisocyanate (the brand name of which is Colonate, manufactured by Nippon Polyurethane Co.) was added to make the magnetic coating material.

After the magnetic coating materials for use in the first magnetic layer and the second magnetic layer were coated on the support by the conventional method, the magnetic particles were magnetically oriented and the magnetic coating materials were dried to manufacture the magnetic recording medium.

The electromagnetic characteristics and other characteristics of the magnetic recording medium manufactured by the method described above, were measured.

The treating conditions of the surface treating agents for Si, Al, and the like used in the second magnetic layer and other manufacturing conditions are shown in Table III. The characteristics of the magnetic recording materials obtained by the method described above, were measured and the results are shown in Table IV.

TABLE I

MAGNETIC COATING MATERIALS FOR USE IN THE FIRST MAGNETIC LAYER (THE LOWER LAYER)

| COMPONENT | Ratio (WEIGHT PART) |
|---|---|
| Co-γ-Fe$_2$O$_3$: (Hc = 700.0 e, BET Value = 38 m$^2$/g) | 100 |
| Vinyl chloride-vinyl acetate-vinyl alcohol-copolymer (Brand name VAGH manufactured by Union Carbide Co.) | 10 |
| Polyester polyurethane (Brand name N3132 manufactured by Nippon Polyurethane Industry Co.) | 5 |
| Myristic acid | 1 |
| Stearic acid | 1 |
| Butyl stearate | 1 |
| Methyl ethyl keton | 100 |
| Cyclohexanone | 100 |
| Toluene | 100 |

TABLE II

MAGNETIC COATING MATERIALS FOR USE IN THE SECOND MAGNETIC LAYER (THE UPPER LAYER)

| COMPONENT | Ratio (WEIGHT PART) |
|---|---|
| *Co-γ-Fe$_2$O$_3$: (Hc = 900.0 e, BET Value = 50 m$^2$/g) | 100 |
| Vinylchloride containing sulfonic acid potassium (Brand name MR110 manufactured by Nippon Zeon Co.) | 10 |
| Polyurethane resin containing sulfonic acid sodium (Brand name UR8300 manufactured by Toyoboseki Co.) | 5 |
| Al$_2$O$_3$ (Average particle size 0.2 μm) | 5 |
| **Carbon black | 1 |
| Myristic acid | 1 |
| Stearic acid | 1 |
| Butyl stearate | 1 |
| Methyl ethyl keton | 100 |
| Cyclohexanone | 100 |
| Toluene | 100 |

*The surface treating conditions of Co-γ-Fe$_2$O$_3$ are shown in Table 3.
**The particle size is shown in Table 3.

TABLE III

TREATING CONDITIONS OF THE SURFACE TREATING AGENT

| | Surface treating conditions of Co-γ-Fe$_2$O$_3$ | | Particle size of carbon black in the second magnetic layer (mμm) | Thickness of magnetic layer The second magnetic layer/ The first magnetic layer (μm) |
|---|---|---|---|---|
| | Treating agent | *Treated volume | | |
| Sample 1 | Si | 0.5 | 50 | 0.8/3.2 |
| Sample 2 | Si | 0.3 | 50 | 0.8/3.2 |
| Sample 3 | Si + Al | 0.5 + 0.1 | 50 | 0.8/3.2 |
| Sample 4 | Si + Al | 0.5 + 0.1 | 80 | 0.8/3.2 |
| Sample 5 | — | — | 50 | 0.8/3.2 |
| Sample 6 | Si | 0.5 | 30 | 0.8/3.2 |
| Sample 7 | Si | 0.5 | — | 0.8/3.2 |
| Sample 8 | Si | 0.5 | 50 | 4.0/0 |
| Sample 9 | — | — | — | 0/4.0 |

*Weight % to Co-γ-Fe$_2$O$_3$

TABLE IV

CHARACTERISTICS OF THE MAGNETIC RECORDING MEDIUM

| Characteristics | Chroma output (dB) | Y-CN(dB) | | Sliding Noise (dB) | | Dropout (The number of particles/Min.) |
|---|---|---|---|---|---|---|
| | | 6.0M | 8.0M | 1 pass | 10 passes | |
| Sample 1 | +1.0 | +2.0 | +2.1 | +1.1 | +2.0 | 3 |
| Sample 2 | +1.1 | +1.8 | +1.7 | +1.3 | +2.3 | 2 |

TABLE IV-continued

CHARACTERISTICS OF THE MAGNETIC RECORDING MEDIUM

| Characteristics | Chroma output (dB) | Y-CN(dB) 6.0M | Y-CN(dB) 8.0M | Sliding Noise (dB) 1 pass | Sliding Noise (dB) 10 passes | Dropout (The number of particles/Min.) |
|---|---|---|---|---|---|---|
| Sample 3 | +1.1 | +2.5 | +2.4 | +1.0 | +2.2 | 1 |
| Sample 4 | +1.0 | +2.2 | +2.3 | +0.8 | +1.5 | 2 |
| Sample 5 | +1.0 | +0.5 | +0.4 | +1.5 | +3.0 | 30 |
| Sample 6 | +1.2 | +2.0 | +2.2 | +1.1 | +8.0 | 2 |
| Sample 7 | +1.3 | +2.0 | +2.3 | +2.0 | +10.5 | 10 |
| Sample 8 | 0 | +2.0 | +2.1 | +1.1 | +2.0 | 110 |
| Sample 9 | +1.0 | 0 | 0 | +1.0 | +1.5 | 5 |

As shown in Table VI, it is clear that Samples 1 to 4 have superior electrostatic conversion characteristics such as chroma output, Y-CN, and the like, and furthermore these samples produce little sliding noise and dropout. It can be considered that the characteristics of Samples 1 to 4 are well balanced and maintain a high level. On the other hand, although Samples 5 to 9 are good in electromagnetic conversion characteristics and dropout, the sliding noise after 10 passes is loud (Sample 6), and although some are good in electromagnetic conversion characteristics and sliding noise, the dropout rate is high (Sample 6). Accordingly, the characteristics of Samples 5 to 9 are not well balanced and do not maintain a high level.

The magnetic coating materials the composition of which is shown in Table 1 and Table 2, were individually kneaded in order to disperse each component. Then, the viscosity of the magnetic coating materials was adjusted by adding a solvent such as methyl ethyl keton and toluene so that the viscosity became 1 to 20 centipoise. After that, 5 parts by weight of polyisocyanate was added to make the magnetic coating materials of Example 1.

The magnetic coating materials for use in the upper layer and the lower layer were made, the composition of which is the same as that of the magnetic coating materials shown in Table 1 and Table 2 except for the magnetic powder and lubricant used in each of the first and second magnetic layers, wherein the magnetic coating materials for the upper and lower magnetic layers are used in Example 2 and Comparative Examples 1 to 5. After that, the magnetic coating materials for use in the upper and lower layers in each example were coated by the conventional method to form a multilayer on the support.

The thickness of the first magnetic layer was 0.5 μm and the thickness of the second magnetic layer was 3.0 μm.

Then, the characteristics of the obtained magnetic recording tape were measured. The amount of the surface treating agent and the lubricant of the present invention used in the first and the second magnetic layers of each example, is shown in Table 3–4. The characteristics of the obtained tape are shown in Table 5 and Table 6.

TABLE 1

THE FIRST MAGNETIC LAYER (THE LOWER LAYER)

| Component | Ratio Weight Part |
|---|---|
| Co-γ-Fe$_2$O$_3$-BET Value 50 m$^2$/g (the average particle size 0.25 μm) | 100 |
| Al$_2$O$_3$ (the average particle size 0.3 μm) | 5 |
| Carbon black (the average particle size 50 μm) | 0.5 |
| Polyvinylchloride with negative functional groups (Brand name MR110 manufactured by Nippon Zeon Co.) | 10 |
| Polyurethane (the average molecular weight 20000) | 5 |
| Myristic acid | 2 |
| Stearic acid | 2 |
| Butyl stearate | 0.5 |
| Cyclohexanone | 100 |
| Methyl ethyl keton | 100 |

TABLE 2

THE SECOND MAGNETIC LAYER (THE UPPER LAYER)

| Component | Ratio Weight Part |
|---|---|
| Co-γ-Fe$_2$O$_3$ (BET Value 50 m$^2$/g, (the average particle size 0.25 μm) | 100 |
| Al$_2$O$_3$ (the average particle size 0.3 μm) | 5 |
| Carbon black (the average particle size 50 mμ) | 0.5 |
| Polyvinylchloride with negative functional groups (Brand name MR110 manufactured by Nippon Zeon Co.) | 10 |
| Polyurethane (the average molecular weight 20000) | 5 |
| Myristic acid | 2 |
| Stearic acid | 2 |
| Butyl stearate | 0.5 |
| Cyclohexanone | 100 |
| Methyl ethyl keton | 100 |

TABLE 3

SURFACE TREATMENT OF MAGNETIC MATERIALS *(WEIGHT %)

| | The first magnetic layer Treating agent | The first magnetic layer Processed quality | The second magnetic layer Treating agent | The second magnetic layer Processed quality |
|---|---|---|---|---|
| Comparative Example 1 | Si | 0.03 | Si | 0.03 |
| | Al | 0.01 | Al | 0.01 |
| Comparative Example 2 | Si | 1.5 | Si | 1.5 |
| | Al | 1.5 | Al | 1.5 |
| Comparative Example 3 | Si | 0.5 | Si | 0.5 |
| | Al | 0.1 | Al | 0.1 |
| Inventive Example 1 | Si | 0.03 | Si | 0.5 |
| | Al | 0.01 | Al | 0.1 |
| Inventive Example 2 | Si | 0.03 | Si | 0.5 |
| | Al | 0.01 | Al | 0.1 |
| Inventive Example 3 | Si | 0.01 | Si | 0.36 |
| | Al | 0 | Al | 0 |
| Inventive Example 4 | Si | 0 | Si | 0.40 |
| | Al | 0.08 | Al | 0.08 |
| Comparative Example 4 | Si | 0.5 | Si | 0.5 |
| | Al | 0.1 | Al | 0.1 |
| Comparative | Si | 0.5 | Si | 0.03 |

TABLE 3-continued

SURFACE TREATMENT OF MAGNETIC MATERIALS *(WEIGHT %)

| | The first magnetic layer | | The second magnetic layer | |
| --- | --- | --- | --- | --- |
| | Treating agent | Processed quality | Treating agent | Processed quality |
| Example 5 | Al | 0.1 | Al | 0.01 |

*per 100 parts by weight of magnetic materials

TABLE 4

QUANTITY OF FATTY ACID IN THE MAGNETIC LAYER (WEIGHT %)

| | The first magnetic layer | | The second magnetic layer | |
| --- | --- | --- | --- | --- |
| Comparative Example 1 | Myristic acid<br>Stearic acid | 1<br>1 | Myristic acid<br>Stearic acid | 1<br>1 |
| Comparative Example 2 | Myristic acid<br>Stearic acid | 1<br>1 | Myristic acid<br>Stearic acid | 1<br>1 |
| Comparative Example 3 | Myristic acid<br>Stearic acid | 1<br>1 | Myristic acid<br>Stearic acid | 1<br>1 |
| Inventive Example 1 | Myristic acid<br>Stearic acid | 1<br>1 | Myristic acid<br>Stearic acid | 1<br>1 |
| Inventive Example 2 | Myristic acid<br>Stearic acid | 1.6<br>1.5 | Myristic acid<br>Stearic acid | 0.5<br>0.5 |
| Inventive Example 3 | Myristic acid<br>Stearic acid | 1<br>1 | Myristic acid<br>Stearic acid | 1<br>1 |
| Inventive Example 4 | Myristic acid<br>Stearic acid | 1<br>1 | Myristic acid<br>Stearic acid | 1<br>1 |
| Comparative Example 4 | Myristic acid<br>Stearic acid | 1.5<br>0.5 | Myristic acid<br>Stearic acid | 0.5<br>0.5 |
| Comparative Example 5 | Myristic acid<br>Stearic acid | 1.5<br>1.5 | Myristic acid<br>Stearic acid | 0.5<br>0.5 |

TABLE 5

| | Grade of cleanliness of the conveyance rollers in the drying process | Grade of cleanliness of the calender rollers (heat rollers) |
| --- | --- | --- |
| Comparative Example 1 | C | D |
| Comparative Example 2 | C | C |
| Comparative Example 3 | B | D |
| Inventive Example 1 | A | A |
| Inventive Example 2 | A | B |
| Inventive Example 3 | A | A |
| Inventive Example 4 | A | A |
| Comparative Example 4 | C | D |
| Comparative Example 5 | D | D |

Criterion
A: Perfectly clean (It is possible to coat continuously.)
B: Nearly perfectly clean (There is no actual harm.)
C: Slightly dirty (It is impossible to coat continuously.)
D: Seriously dirty (It is impossible to coat continuously.)

TABLE 6

Results after 50 passes OF THE TAPE at 40° C. and 80%

| | Output drop (dB) | Tape edge damage | Coefficient of dynamic friction at a high temperature (40° C.) |
| --- | --- | --- | --- |
| Comparative Example 1 | −2.5 | D | 0.35 |
| Comparative Example 2 | −2.7 | D | 0.29 |
| Comparative Example 3 | −1.8 | D | 0.32 |
| Inventive Example 1 | −0.1 | B | 0.19 |
| Inventive Example 2 | −0.2 | A | 0.18 |
| Inventive Example 3 | −0.3 | A | 0.20 |
| Inventive Example 4 | −0.2 | A | 0.21 |
| Comparative Example 4 | −0.9 | C | 0.28 |
| Comparative Example 5 | −0.8 | D | 0.31 |

Criterion
A: The tape edge is not damaged.
B: Slight damage can be found. The tape is crinkled. However, there is no actual harm.
C: The tape edge is heavily damaged. The audio output level is unstable.
D: The tape edge is heavily damaged and slippage in synchronization occurs.

The Inventive Example 5 is defined as the magnetic coating material characterized in that: polyurethane in the second magnetic layer in the Inventive Example 1 is replaced with polyurethane resin containing sulfonic acid sodium; and the average particle size of carbon black is changed to 65 mµ. The Inventive Example 6 is defined as the magnetic coating material characterized in that: the average particle size in the Inventive Example 5 is changed from 65 mµ to 80 mµ; and the thickness of the second magnetic layer is changed to 0.6 µm. The chroma output, Y-CN, the sliding noise and dropout of the Inventive Example 5 and 6 are shown in Table 7.

TABLE 7

CHARACTERISTICS OF THE MAGNETIC RECORDING MEDIUM

| Character-istics | Chroma output (dB) | Y-CN(dB) | | Sliding noise (dB) | | Dropout (Number/min.) |
| --- | --- | --- | --- | --- | --- | --- |
| | | 6.0M | 8.0M | 1 pass | 10 passes | |
| Inventive Example 5 | +1.2 | +1.9 | +1.5 | +1.2 | +2.2 | 3 |
| Inventive Example 6 | +1.1 | +1.8 | +1.6 | +1.3 | +1.2 | 5 |

Both Example 5 and 6 were nearly the same as Example 1 in terms of cleanliness of the conveyance rollers in the drying process, cleanliness of the calender rollers, drop of RF output, damage of the tape edge, and the coefficient of dynamic friction at a high temperature.

The measurement method adopted in the Inventive Example and the Comparative Example will be described as follows.

Drop of RF Output

The tape was loaded in a VHS tape cassette and repeatedly run for 50 passes in a playback unit (manufactured by Matsushita Electric Co.) at 40° C. and 80%. Then, the variation in RF output was measured.

Tape Edge Damage

Visual inspection was conducted after the tape had made 50 passes.

Coefficient of Dynamic Friction µk

The running tester (TBT-300-D) was used at 23° C. and 50% RH and the entry tension ($T_1$) was set. The sample tape was wound around a stainless steel pin of 3.8 mm diameter at an angle of 180° and run at a speed of 3.3 cm/sec. After 1 minute, the delivery tension ($T_0$) was measured and the coefficient of dynamic friction was obtained by the following expression.

$$\mu k = ln(T_0/T_1)/\pi$$

Chroma Output

The output was obtained when the tape was played back at 500 KHz RF.

Y-CN (1) The magnetic recording tape is rapidly wound until the thickness of the wound tape on the reel becomes about 3 mm. Then, signals at a frequency of 6 MHz are recorded for 10 minutes. This magnetic recording tape is played back 3 times. The recording level is equal to +20% of the most adequate recording value of the comparative tape.

(2) Signals at the frequencies of 4, 5, 6, and 8 MHz are recorded for 3 minutes on the portion of the tape on which the signals of 6 MHz were recorded in the process (1) described above. The recording level is equal to +20% of the most adequate recording level of each comparative tape. Playback output of RF (which is defined as C) and C/N of the tape are compared with those of the comparative tape.

Sliding Noise (1) The tape is played back while it is stationary and the system noise is measured by the spectrum analyzer.

(2) The sample tape is played back for 1 minute and the sliding noise is measured by the spectrum analyzer. (1 pass)

(3) The sample tape is played back for 1 minute and this operation is repeated 10 times. The sliding noise is measured by the spectrum analyzer. (10 passes)

(4) The noise level of about 9 MHz is measured when the tape is run by 1 pass and 10 passes, wherein the measurement is based upon the level of the system noise (the level of the system noise is 0 dB).

* All noise measurements are conducted under the environmental conditions in which the room temperature is 20±2° C. and the relative humidity is 10+2% while the upper cover of VTR is removed.

Dropout is measured as follows. White signals (100% white signals) are inputted into the predetermined portion (10 m to 30 m) of the tape. Then, the tape is played back. While being played back, dropout is measured by the counter (Model VH01BZ manufactured by Shibasoku Co.) in such a manner that when the level of signal has dropped to −14 dB for 10 μs, the dropout is counted, wherein the measurement is conducted minute by minute and all the measurements are averaged to provide the results.

POSSIBILITY FOR INDUSTRIAL USE OF THE INVENTION

The magnetic recording medium of the present invention is characterized in that: the magnetic recording medium does not stain the conveyance rollers and the like in its manufacturing process, especially in the drying and subsequent processes; the problems which tend to occur when running conventional magnetic tapes, can be avoided even when the tape is run under severe conditions such as high temperature and high humidity; and the magnetic recording medium of the present invention is suitable for a video tape and its manufacture is siplified.

What is claimed is:

1. A magnetic recording medium comprising
   a first magnetic layer on a non magnetic support, said first magnetic layer containing a binder and a first magnetic powder; and
   a second magnetic layer on said first magnetic layer, said second magnetic layer containing a binder and a second magnetic powder comprising a first element selected from the group consisting of AL, Si, and mixtures thereof, a resin having a functional group, carbon black having an average particle size of not less than 50 mμ, and said second magnetic layer having a thickness of not more than 1.0 μm.

2. The magnetic recording medium of claim 1 wherein said second magnetic powder contains 0.3% to 1.0% by weight of Si based on said second magnetic powder, or 0.5% to 0.3% by weight of Al based on said second magnetic powder.

3. The magnetic recording medium of claim 1 wherein a surface of said second magnetic powder is surface treated by Al or Si.

4. The magnetic recording medium of claim 1 wherein said second magnetic powder contains 0.3% to 1.0% by weight of Si based on said second magnetic powder, and 0.5% to 0.3% by weight of Al based on said second magnetic powder.

5. The magnetic recording medium of claim 1 wherein said first magnetic layer or said second magnetic layer contains an abrasive having an average particle size of 0.05 to 5 μm.

6. The magnetic recording medium of claim 1 containing at least one resin selected from the group consisting of a vinyl chloride resin having a negative functional group thereon and a polyurethane resin having a negative functional group thereon.

7. The magnetic recording medium of claim 1 wherein said first magnetic layer and said second magnetic layer contain a lubricant.

8. The magnetic recording medium of claim 3 wherein said second magnetic powder contains 0.3% to 1.0% by weight of Si based on said second magnetic powder, or 0.5% to 0.3% by weight of Al based on said second magnetic powder.

9. The magnetic recording medium of claim 6 wherein said resin is in said second magnetic layer.

10. The magnetic recording medium of claim 6 wherein said negative functional group is a sulfonic acid salt.

* * * * *